(12) United States Patent
Nakamura et al.

(10) Patent No.: US 6,686,049 B1
(45) Date of Patent: Feb. 3, 2004

(54) ANTI-REFLECTION COLORED FILM-COATED GLASS PRODUCTS AND PLASMA DISPLAY PANEL OPTICAL FILTERS

(75) Inventors: Koichiro Nakamura, Osaka-fu (JP); Toshifumi Tsujino, Osaka-fu (JP)

(73) Assignee: Nippon Sheet Glass Co., Ltd. (JP)

( * ) Notice: Subject to any disclaimer, the term of this patent is extended or adjusted under 35 U.S.C. 154(b) by 0 days.

(21) Appl. No.: 09/545,742

(22) Filed: Apr. 3, 2000

Related U.S. Application Data

(63) Continuation of application No. PCT/JP99/04250, filed on Aug. 4, 1999.

(30) Foreign Application Priority Data

Aug. 5, 1998 (JP) ........................................ H10-221353

(51) Int. Cl.$^7$ .............................. B32B 9/00; F21V 9/00; G02B 21/06
(52) U.S. Cl. ........................ 428/428; 428/432; 428/433; 428/697; 428/699; 428/701; 428/702; 359/359; 359/580; 359/586
(58) Field of Search ................................ 428/426, 432, 428/428, 433, 434, 697, 699, 701, 702; 502/240, 242, 243, 350; 359/359, 580, 586

(56) References Cited

U.S. PATENT DOCUMENTS 5,496,621 A * 3/1996 Makita et al. ............... 428/216
5,876,854 A * 3/1999 Kawazu et al. ............. 428/428
5,942,331 A * 8/1999 Miyauchi et al. ........... 428/428
6,379,803 B1 * 4/2002 Nakamura et al. .......... 428/428

FOREIGN PATENT DOCUMENTS

| | | |
|---|---|---|
| JP | 06191896 | 7/1994 |
| JP | 09295834 | 10/1997 |
| JP | 09306366 | 10/1997 |

OTHER PUBLICATIONS

H. Kozuka et al., *Journal of Sol–Gel Science and Technology*, 2:741–744 (1994). No Month.

* cited by examiner

Primary Examiner—Deborah Jones
Assistant Examiner—G. A. Blackwell-Rudasill
(74) Attorney, Agent, or Firm—J. Mark Konieczny; Edwards & Angell, LLP; David G. Conlin

(57) ABSTRACT

Anti-reflection colored film-coated glass products prepared by forming on a transparent glass substrate with a refractive index of 1.47–1.53, a high refractive index film with a refractive index of 1.59–2.30 and a film thickness of 80–140 nm and containing 0–85% silicon oxides, 10–95% titanium oxides and 5–30% fine gold particles in terms of weight percentage, and by forming on the high refractive index film, a low refractive index film with a refractive index which is a value in the range of 1.35–1.58 and at least 0.20 smaller than the refractive index of the high refractive index film, having a film thickness of 70–99 nm and containing 90–100% silicon oxides in terms of weight percentage. These anti-reflection colored film-coated glass products of the invention have excellent anti-reflection performance for visible light and allow freedom in control of the color tones of transmitted light, and thus provide anti-reflection colored film-coated glass products with high visible light transmittance as well as the PDP optical filters that employ them.

11 Claims, No Drawings

ANTI-REFLECTION COLORED FILM-COATED GLASS PRODUCTS AND PLASMA DISPLAY PANEL OPTICAL FILTERS

This application is a continuation of International Application No. PCT/JP99/04250, filed on Aug. 4, 1999, which is incorporated herein by reference in its entirety.

TECHNICAL FIELD

The present invention relates to anti-reflection colored film-coated glass products, and particularly to anti-reflection colored film-coated glass panels that reduce visible light reflection and adjust transmitted color tones, and to optical filters that employ them.

BACKGROUND ART

Anti-reflection films have been conventionally used in optical parts of cameras and eyeglasses, and in indicators for OA electronic devices such as indicator panels and displays. Such anti-reflection films must have low reflective properties and high transmittivity in order to increase visibility or enhance the original optical properties.

A wide variety of colored films comprising inorganic oxides doped with fine noble metal powders have been known. For example, it has been disclosed that doping silica-titania films with fine gold powder provides color film-attached glass, and that colors such as red, reddish-purple, blue, blue-green and green can be obtained depending on the amount of silica and titania in the films. [For example, (a) H. Kozuka, Control of optical properties of gel-derived oxide coating films containing fine metal particles, J. Sol-Gel Sci. Tech., 2, 741–744(1994), and Japanese Laid-open Patent Publication No. H6–191896].

There have also been disclosed glass products coated with colored films to a thickness of 80–140 nm, having visible light reflectivity (light irradiation from the film side) of 5–7% and colored red/reddish purple to green/gray to gray, by doping silica films or silica-titania films with fine gold powder ((b) Japanese Laid-open Patent Publication No. H9–295834).

On the other hand, plasma display panels (PDPs) have been developed in recent years for large-sized wall-mounted television sets, and efforts are being devoted toward development of their wider use. The front side of a PDP is commonly provided with an optical filter having a multi-layer anti-reflection layer to prevent reflection of external light and an electromagnetic wave blocking layer, and this complements the color emitted by the PDP.

For example, there are known products wherein an anti-reflection film (made by overlapping vapor deposited films of materials with different refractive indexes) is bonded to one surface of a colored transparent substrate (for production of acrylic resins or polycarbonate resins, a mixture of a pigment that absorbs the excess red components emitted by the PDP into the resin prevents the purplish appearance of emitted color tones that are originally blue colors) with a transparent adhesive, while (1) a film that blocks electromagnetic waves and a line spectrum in the near infrared region (made, for example, by sputtering the surface of a PET film with silver-inorganic oxide fine particles) and (2) an interference pattern-preventing film (prepared, for example, by forming fine irregularities on the outside surface of a transparent film so as to prevent adhesion to the PDP even when contacted with the PDP) are bonded with a transparent adhesive in that order onto the other surface of the transparent substrate (for example, (c) Japanese Laid-open Patent Publication No. H9–306366).

The prior art colored films of (a) that are doped with fine noble metal powders allow a certain degree of freedom in control of color tones, but offer virtually no anti-reflection performance. Those of (b) with reflectivity referred to above have had a problem in that they exhibit little difference from untreated transparent substrates in terms of their visible light ray reflectivity values, and have notable reductions in transmittance.

For optical filters used in PDPs, since the films of (c) have pigments mixed in resin sheets and anti-reflection films are pasted onto their surfaces, their higher production cost has been a problem.

It is an object of the present invention to solve these issues associated with the prior art by providing anti-reflection colored film-coated glass products which have excellent anti-reflection performance for visible light, allow freedom in control of the color tones of transmitted light, and which have high visible light transmittance, as well as the PDP optical filters that employ them.

DISCLOSURE OF THE INVENTION

The present invention provides an anti-reflection colored film prepared by forming an anti-reflection film comprising two layers with different refractive indexes on a transparent glass substrate, while using at least one of the layers as a selective absorption film to provide a coloring function.

In other words, the present invention relates to an anti-reflection colored film-coated glass product prepared lby forming on a transparent glass substrate with a refractive index of 1.47–1.53, a high refractive index film with a refractive index of 1.59–2.30 and a film thickness of 80–140 nm and containing 0–85% silicon oxides, 10–95% titanium oxides and 5–30% fine gold particles in terms of weight percentage, and by forming on the high refractive index film, a low refractive index film with a refractive index which is a value in the range of 1.35–1.58 and at least 0.20 smaller than the refractive index of the high refractive index film, having a film thickness of 70–99 nm and containing 90–100% silicon oxides in terms of weight percentage.

The invention further relates to an anti-reflection colored film-coated glass product prepared by forming on the aforementioned transparent glass substrate, a high refractive index film with a refractive index which is a value in the range of 1.59–2.30 and a film thickness of 80–140 nm and containing 0–89% silicon oxides and 11–100% titanium oxides in terms of weight percentage, and by forming on the high refractive index film, a low refractive index film with a refractive index of 1.35–1.58 and at least 0.20 smaller than the refractive index of the aforementioned high refractive index film, having a film thickness of 70–99 nm and containing 70–95% silicon oxides and 4–30% fine gold powder in terms of weight percentage.

Each of the components of the high refractive index film of the invention will now be explained.

The silicon oxides are not essential components but are effective for adjusting the refractive index of the film, and when present in a low content they increase the refractive index of the colored film, producing a bluish green color in the film. Conversely, when present in a high content the refractive index of the colored film is lowered, producing a reddish purple color in the film.

If the silicon oxide content is too high, the substrate will undergo deformation due to a large contraction of the film during heating of the film, and therefore the silicon oxide content is 0–85 wt %, and preferably 0–70 wt %, in terms of $SiO_2$.

The titanium oxides are necessary for formation of the film and to increase the refractive index of the colored film, and when they are present in a low content they lower the refractive index of the colored film, producing a reddish purple color in the film. When the titanium oxides are present in a high content they increase the refractive index of the colored film, producing a bluish green color in the film.

If the titanium oxide content is very low the film formability and transparency are reduced, and therefore the content is 10–95wt %, preferably 20–90wt % and more preferably 25–85 wt % in terms of $TiO_2$.

The gold, in the form of fine coloring particles, is necessary to provide color to the high refractive index film, and if its content is very low the coloring obtained will be insufficient, whereas if it is too high the durability of the film may be decreased and loses excess fine gold particles out of the film and preventing their color contribution. The fine gold particle content is therefore 5–30 wt %, preferably 5–25 wt %, and more preferably 8–23 wt %.

If the thickness $d_1$ (physical film thickness) of the high refractive index film is too small the anti-reflection effect will be lower, and the coloring effect will be reduced. Conversely, if it is too thick, the anti-reflection effect will be lower, and cracks may be produced thus lowering the film strength; the film thickness is therefore 80–140 nm, preferably 85–125 nm, and more preferably 89–125 nm. If the refractive index $n_1$ of the high refractive index film is too low, a sufficient anti-reflection effect cannot be achieved, and it is therefore 1.59–2.30, preferably 1.65–2.23, and more preferably 1.70–2.20. The refractive index of the high refractive index film is defined as the value at a wavelength of 550 nm, for a film containing silicon oxide and titanium oxide when no fine gold particles are present. The optical film thickness $(n_1 d_1)$ of the high refractive index film preferably has a value of ¼ of any wavelength in the visible light range (380–680 nm), in order to reduce the visible light reflectivity, and specifically the optical film thickness of the high refractive index film is preferred to be in the range of 95–170 nm. However, because the reflected color tends to be tinged with red within this range and red reflected light is usually not desirable, the optical film thickness is preferably selected between 155–230 nm which is slightly above the aforementioned range, in order to provide a blue tinge to the reflected color.

The low refractive index film of the invention will now be explained.

The silicon oxides are necessary for formation of the film and to lower the refractive index of the low refractive index film, and the silicon oxide content is 90–100 wt %, preferably 92–100 wt % and more preferably 95–100 wt %, in terms of $SiO_2$.

If the thickness $d_2$ (physical film thickness) of the low refractive index film is too small the anti-reflection effect will be reduced, while if it is too large cracks may be produced, reducing the film strength; it is therefore 70–99 nm, preferably 75–95 nm, and even more preferably 77–93 nm. If the refractive index of the low refractive index film is too high it will not be possible to achieve an adequate anti-reflection effect, and therefore the refractive index $n_2$ of the low refractive index film is in the range of 1.35–1.58 while also being a value that is at least 0.20 smaller than the refractive index of the high refractive index film, preferably 1.36–1.53, and more preferably 1.37–1.49.

The refractive index of the low refractive index film is defined as the value at a wavelength of 550 nm, while the refractive index of the low refractive index film when the low refractive index film contains fine gold particles as described hereunder is defined as the value for a film containing silicon oxide when no fine gold particles are present.

The optical film thickness $(n_2 d_2)$ of the low refractive index film preferably has a value of ¼ of any wavelength in the visible light range (380–680 nm, and preferably 420–600 nm where the luminosity is high), in order to reduce the visible light reflectivity, and more specifically the optical film thickness of the low refractive index film is preferred to be in the range of 105–150 nm.

A case where the high refractive index film includes fine gold particles has been explained above, but instead of including fine gold particles in the high refractive index film they may be included in the low refractive index film. The following explanation concerns each of the components of a high refractive index film which contains no fine gold particles.

The silicon oxides are not essential components but are effective for adjusting the refractive index of the film. If the silicon oxide content is too high, the substrate will undergo deformation by a large contraction of the film during heating of the film, and therefore the silicon oxide content is 0–89 wt %, preferably 10–75 wt % and more preferably 20–70 wt %, in terms of $SiO_2$.

The titanium oxides are necessary for formation of the film and to increase the refractive index of the colored film. If the titanium oxide content is too low it becomes difficult to obtain an anti-reflection effect and the film formability and transparency are reduced; the content is therefore 11–100 wt %, preferably 20–95 wt % and more preferably 30–85 wt % in terms of $TiO_2$.

A low refractive index film containing fine gold particles will now be explained.

The silicon oxides in the low refractive index film containing fine gold particles are necessary for formation of the film and to lower the refractive index of the low refractive index film, and the silicon oxide content is 70–96 wt %, preferably 72–96 wt % and more preferably 75–96 wt %, in terms of $SiO_2$.

The fine gold particles in the low refractive index film serve as coloring fine particles which are necessary to provide color to the low refractive index film, and if their content is very low the coloring obtained will be insufficient, whereas if it is too high the durability of the film may be decreased and loses excess fine gold particles out of the film and preventing their color contribution. The fine gold particle content is therefore 4–30 wt %, preferably 4–25 wt % and more preferably 4–23 wt %.

The above explanation relates to cases where the high refractive index film contains fine gold particles and cases where the low refractive index film contains fine gold particles. Other cases are also possible, however, such as where both the high refractive index film and low refractive index film contain fine gold particles. In such cases, the high refractive index film contains silicon oxides at 0–89 wt %, preferably 10–75 wt % and more preferably 20–65 wt % in terms of $SiO_2$, titanium oxides at 10–100 wt %, preferably 20–95 wt % and more preferably 30–85 wt % in terms of $TiO_2$ and fine gold particles at 0–30 wt %, for the same reasons as the high refractive index film explained above. The low refractive index film contains silicon oxides at 70–100 wt %, preferably 72–96 wt % and more preferably 75–96 wt % in terms of $SiO_2$ and fine gold particles at 0–30 wt %, for the same reasons as the low refractive index film explained above. Here, the total of the fine gold particle content in the high refractive index film and the fine gold particle content in the low refractive index film is 4–30 wt %, preferably 4–25 wt % and more preferably 8–20 wt %.

There is also no problem if the high refractive index film containing or not containing fine gold particles also contains other components in addition to the silicon oxides and titanium oxides, for example, zirconium oxide, cerium oxide, zinc oxide, tantalum oxide, cobalt oxide, chromium oxide, copper oxide, manganese oxide, nickel oxide, iron oxide and fine gold particles (not necessary when the high refractive index film contains fine gold particles), etc., in small amounts totaling, for example, no more than 10 wt % in terms of $ZrO_2$, $CeO_2$, $ZnO$, $Ta_2O_5$, $CoO$, $CrO$, $CuO$, $MnO$, $NiO$, $Fe_2O_3$ and $Au$. Here, the total of the Au fine particles in the high refractive index film and the Au fine particles in the low refractive index film is preferably not exceeding 30 wt %.

Likewise, there is no problem if the low refractive index film containing or not containing fine gold particles also contains other components in addition to the silicon oxides, for example, titanium oxide, zirconium oxide, cerium oxide, zinc oxide, tantalum oxide, cobalt oxide, chromium oxide, copper oxide, manganese oxide, nickel oxide, iron oxide and fine gold particles (not necessary when the low refractive index film contains fine gold particles), etc., in small amounts totaling, for example, no more than 10 wt % in terms of $TiO_2$, $ZrO_2$, $CeO_2$, $ZnO$, $Ta_2O_5$, $CoO$, $CrO$, $CuO$, $MnO$, $NiO$, $Fe_2O_3$ and $Au$. Here, the total of the Au fine particles in the low refractive index film and the Au fine particles in the high refractive index film is preferably not exceeding 30 wt %.

The method for forming the high refractive index film and low refractive index film of the invention may be a sol-gel method, sputtering method, CVD method or the like, but a sol-gel method is preferred from the standpoint of cost. For coating by a sol-gel method there may be employed a spin coating, dip coating, flow coating, meniscus coating, roll coating, gravure coating, flexographic printing or screen printing method.

When the high refractive index film and low refractive index film of the invention are formed by a sol-gel method, for example, as optical thin-films containing titanium oxide, silicon oxide and fine gold particles, the coating composition comprises a titanium compound, silicon compound, gold material and solvent, and is obtained by combining the titanium compound, silicon compound and gold material in an organic solvent.

As titanium compounds there may be used titanium alkoxide, titanium alkoxide chloride, titanium chelate compounds, etc. Examples of titanium alkoxides include titanium methoxide, titanium ethoxide, titanium n-propoxide, titanium isopropoxide, titanium n-butoxide, titanium isobutoxide, titanium methoxypropoxide, titanium stearyl oxide, titanium 2-ethylhexyl oxide, etc. As titanium alkoxide chlorides there may be recommended titanium chloride triisopropoxide, titanium dichloride diethoxide, etc. As titanium chelate compounds there may be used titanium triisopropoxide (2,4-pentanedionate), titanium diisopropoxide (bis-2,4-pentanedionate), titanium allylacetate triisopropoxide, titanium bis(triethanolamine) diisopropoxide, titanium di-n-butoxide (bis-2,4-pentanedionate), etc.

The silicon compound used may be one prepared by mixing a silicon alkoxide in a solvent such as alcohol, and promoting hydrolysis and polymerization with an acidic or basic catalyst. The silicone alkoxide used may be silicon methoxide, silicon ethoxide or an oligomer thereof. As acidic catalysts there may be used hydrochloric acid, sulfuric acid, nitric acid, acetic acid, oxalic acid, trichloroacetic acid, trifluoroacetic acid, phosphoric acid, fluoric acid, formic acid, etc. As basic catalysts there may be used ammonia and amines.

As materials for the fine gold particles there may be recommended gold chloride.$4H_2O$, gold choride.$3H_2O$, gold sodium chloride.$2H_2O$, gold cyanide, gold potassium cyanide, gold diethylacetyl acetonate complex, gold colloid dispersions, and the like.

The organic solvent used in the coating composition for formation of the high refractive index film and low refractive index film will depend on the coating method, and methanol, ethanol, isopropanol, butanol, hexanol, octanol, 2-methoxyethanol, 2-ethoxyethanol, 2-butoxyethanol, propyleneglycol monomethyl ether, propyleneglycol monoethyl glycol, cellosolve acetate, ethylene glycol, propylene glycol, diethylene glycol, diethyleneglycol monoethyl ether, hexylene glycol, diethylene glycol, tripropylene glycol, polypropylene glycol, diacetone alcohol, etc. may be mentioned. The coating composition may employ the aforementioned solvent alone or more than one solvent for adjustment of the viscosity, surface tension, etc. of the coating solution. A small amount of a stabilizer, leveling agent, thickening agent or the like may also be added according to need. The amount of the solvent used will depend on the final film thickness of the resulting high refractive index film and low refractive index film and on the method of coating employed, but it is normally used in an amount such that the total solid portion is in the range of 1–20%.

After application of the coating composition by the aforementioned coating method, it is dried and/or sintered by heating at a temperature of 250° C. or above, and then after applying the next coating solution, it is dried and/or sintered by heating at a temperature of 250° C. or above to complete the anti-reflection colored film-coated glass product. The film obtained in this manner exhibits excellent performance including transparency, environmental stability and scratch resistance, and even with lamination it is possible to minimize film peeling and cracking which tend to occur due to differences in the thermal shrinkage rates during the process of densification of the high refractive index film layer and low refractive index film layer.

The following light irradiation method may also be used instead of the aforementioned preparing method involving drying and/or sintering by heating at 250° C. or above. Specifically, it is a method for repeated coating and drying steps, whereby application of the coating composition by the aforementioned coating method is followed by a step of irradiating the coated film with electromagnetic waves of a wavelength shorter than visible light, and then subsequent application of the next coating solution is followed by a step of irradiating the coated film with electromagnetic waves of a wavelength shorter than visible light. The electromagnetic waves of a wavelength shorter than visible light may be γ waves, X-rays or ultraviolet rays, but ultraviolet rays are preferred from the standpoint of equipment practicality for irradiation of large surface area substrates. The ultraviolet light source used may be an excimer lamp, low-pressure mercury lamp, high-pressure mercury lamp, metal halide lamp, or the like. It is preferable to use a high-pressure mercury lamp with 365 nm as the principal wavelength which efficiently emits light of 254 nm and 303 nm, for irradiation of the coated film at an irradiation intensity of 10 mW/cm² or greater, preferably 50 mW/cm² or greater and more preferably 100 mW/cm² or greater. Using this type of ultraviolet light source for irradiation of an irradiation energy of 100 mJ/cm² or greater, preferably 500 mJ/cm² or greater and more preferably 1000 mJ/cm² or greater on the coated film side which was applied using the coating composition of the invention, will give a film with excellent performance including transparency, environmental stability and scratch resistance at low temperature, and resistance to cracking.

The drying and/or sintering by heat may be carried out simultaneously with irradiation of ultraviolet rays. Drying by ultraviolet irradiation carried out simultaneously with a drying step involving heat drying at a temperature of preferably no higher than 250° C. can give a coated film with excellent performance including transparency, environmental stability and scratch resistance, and even with lamination, can minimize film peeling and cracking which tend to occur due to differences in the thermal shrinkage rates during the process of densification of the high refractive index film layer and low refractive index film layer. By utilizing ultraviolet irradiation in this manner it is possible to speed up the drying step and thereby drastically improve productivity.

As the transparent glass substrate, according to the invention, there may be used a transparent glass product with a refractive index of 1.47–1.53, for example, a non-colored glass plate having a transparent soda lime silicate glass composition, a glass plate which is colored green, bronze, etc., or has the property of blocking ultraviolet rays or heat rays, or other forms of transparent glass plates; preferred are glass plates with a thickness of 0.5 mm–5.0 mm, including glass plates for displays such as PDPs, glass plates for automobiles and glass plates for construction, and either or both surfaces of the glass plate may be coated with the aforementioned anti-reflection colored film. When both surfaces of a flat anti-reflection colored film-coated glass product are used in contact with normal pressure or reduced pressure air or other gas, coating of both surfaces of the glass plate with the anti-reflection colored film can minimize the visible light reflectivity. When one surface of a flat anti-reflection colored film-coated glass product is joined with or adhered to a panel via a plastic intermediate layer, for example, it will usually be sufficient to simply coat the anti-reflection colored film only on the other surface of the glass product.

The anti-reflection colored film-coated glass products of the invention, and especially colored film-coated glass plates used as front glass for display devices such as PDPs, automobile window glass and construction windows, preferably have a transmittance color represented by a chromaticity in a range such that in terms of the Lab color specification system, a is from −15.0 to 20.0 and b is from −15.0 to 3.0. More preferably, the transmittance color is represented by a chromaticity in a range such that in terms of the Lab color specification system, a is from −5.0 to 10.0 and b is from −5.0 to 3.0.

The anti-reflection colored film-coated glass products of the invention provide glass products with excellent reflection-reducing properties by utilizing selective absorption. They can also provide glass products with excellent designs by the colored absorption films. The anti-reflection colored film-coated glass products of the invention may also be combined with electromagnetic wave-blocking films and the like for use as optical filters to be attached to the fronts of PDPs. Since a selective absorption filter is utilized in such cases, there are also provided optical filters that adjust emission colors of PDPs. For example, in a PDP where a fluorescent body that emits a blue color has the property of emitting a slightly red component in addition to the blue color, so that the portion that should be displayed as blue is instead displayed with a purplish tint, the red component of the fluorescent body may be absorbed with a colored film of the invention to balance the emission color from the PDP. When a silver multilayer film is used as an electromagnetic wave-blocking layer, the transmission color of the original optical filter is yellowish green, but by using an anti-reflection colored film of the invention whose transmission color is reddish purple it is possible to adjust the transmission color of the filter as a whole to a neutral gray color or blue-gray color.

The aforementioned optical filter for a plasma display panel provided with an electromagnetic blocking layer on the side opposite the side coated with an anti-reflection colored film, preferably has a transmittance color represented by a chromaticity in a range such that in terms of the Lab color specification system, a is from −3.0 to 3.0 and b is from −3.0 to 3.0. In addition to using a silver multilayer film as an electromagnetic wave-blocking layer as described above, other options include methods of attaching synthetic resin mesh fabrics that have been electroless-plated with high-conductivity metals such as copper or copper-nickel onto transparent substrates, methods for laminating silver thin-films comprised of low-resistance ITO films, silver thin-films and multilayer films directly onto transparent substrates, as well as methods for attaching such laminated films onto transparent substrates.

A PDP has a front glass panel and a back glass panel as members thereof, and if an anti-reflection film-coated glass product of the invention employing a high-strain-point glass substrate, that is, a glass substrate with a strain point of 570° C. or above as the transparent glass substrate is used as the front glass panel of a PDP, it can serve as both the PDP optical filter and the PDP front glass panel, and thus provide a PDP with an anti-reflection film on the surface.

BEST MODE FOR CARRYING OUT THE INVENTION

The invention will now be explained in further detail by way of the following concrete examples.

Preparation of Stock Solution

A dropping funnel was used for dropwise addition of 2 moles of acetyl acetone to one mole of titanium isopropoxide being stirred in a flask. The solution was designated as the titanium oxide stock solution 1. It had a $TiO_2$ solid content of 16.5%. To 50 g of ethyl silicate ("Ethyl Silicate 40", manufactured by Colcoat Co.) there were added 6 g of 0.1 N hydrochloric acid and 44 g of ethyl cellosolve, and the mixture was stirred at room temperature for 2 hours. This solution was designated as the silicon oxide stock solution 2. It had an $SiO_2$ solid content of 20%.

Preparation of Film-forming Solution Composition

Highrefractive indexfilm-forming solutioncompositions were prepared with the composition ratios listed in Table 1 as coating solutions for the first layer, counting from the glass substrate. The titanium oxide stock solution 1, a solvent (ethyl cellosolve), the silicon oxide stock solution 2 and a gold material (gold chloride-4H₂O) were combined in that order in prescribed amounts, and stirring for 2 hours at room temperature yielded the high refractive index film-forming solution compositions indicated by coating solution numbers (H1-H15). Similarly, the amounts shown in Table 2 were used to obtain low refractive index film-forming solution compositions indicated by the coating solution numbers (L1-L15).

EXAMPLES 1–15, COMPARATIVE EXAMPLES 1–4

Coating solution Hi prepared above was used for spin coating onto the surface of one side of a non-colored transparent glass substrate (refractive index=1.50) made of a soda lime silicate composition with a thickness of 1.1 mm and dimensions of 10 cm×10 cm, at a rotation speed of 3000 rpm for 15 seconds. After air drying, it was heat treated at 550° C. for 2 minutes to form a high refractive index colored film, and then coating solution L1 prepared above was spin coated thereon at a rotation speed of 2000 rpm for 15 seconds and after air drying was heat treated at 550° C. for 2 minutes to form a low refractive index film; this yielded a glass plate coated with an anti-reflection colored film comprising a high refractive index colored film and a low refractive index film formed over it. The visible light reflectivity Rvis of this glass plate was measured in two ways, by directing light from a light source D at an angle of 12° from the film side on which the colored film was coated and determining the reflectivity of the film side while the reflected light from the back side (non-film side) was blocked ("Rvis, film side"), and the reflectivity including reflection from the back side and the film side ("Rvis, both sides"). The visible light transmittance Tvis (light source D) was measured according to JIS R-3106, and the chromaticity of the transmitted light was measured according to JIS Z-8729.

The compositions, refractive indexes and film thicknesses of the high refractive index films and low refractive index films were as shown in Tables 3 and 4, and the visible light transmittance (Tvis), the chromaticity of transmitted light and the visible light reflectivity (Rvis) were as shown in Table 5. The obtained colored films exhibited satisfactory results in terms of chemical resistance and abrasion resistance. When the anti-reflection colored film was coated onto both sides of the glass plate, the reflectivity including reflection from the front and back sides ("Rvis, both sides") was 1.2%, which was smaller than the 3.8% reflectivity when the anti-reflection colored film was coated only on the surface of one side of the glass plate ("Rvis, both sides").

Likewise, the coating solutions shown in Tables 1 and 2 (H2-H15 and L2-L15) were used for coating of high refractive index films and low refractive index films having the compositions, refractive indexes and film thicknesses as shown in Tables 3 and 4, respectively, to obtain anti-reflection colored film-coated glass products (Examples 2–15). The results of measurement of their optical properties are summarized in Table 5.

As shown in Table 5, in Examples 1–8 there were obtained anti-reflection film-coated glass products that absorbed red colors so that the transmitted color was green, i.e. the transmitted light chromaticity was such that in terms of the Lab color specification system, a was from −3.1 to −8.4 and b was from −2.9 to −7.8, and the reflectivity of only the film side ("Rvis film side") was 1.0% or lower. In Examples 9–11 there were obtained anti-reflection film-coated glass products that absorbed yellow colors so that the transmitted color was blue, i.e. the transmitted light chromaticity was such that in terms of the Lab color specification system, a was from 0.3 to 0.8 and b was from −3.5 to −10.5, and the reflectivity of only the film side ("Rvis film side") was 1.0% or lower. In Examples 12–15 there were obtained anti-reflection film-coated glass products that absorbed green colors so that the transmitted color was purple-reddish purple, i.e. the transmitted light chromaticity was such that in terms of the Lab color specification system, a was from 2.4 to 9.8 and b was from −5.3 to −1.8, and the reflectivity of only the film side ("Rvis film side") was 1.0% or lower. All of the anti-reflection film-coated glass products of Examples 1–15 exhibited visible light transmittance (Tvis) of 60% or greater.

By adjusting the rotation speed for spin coating as the coating conditions for the high refractive index film-forming coating solution or the low refractive index film-forming coating solution, there were obtained anti-reflection colored film-coated glass products (Comparative Examples 1–4) by the same method as Example 5, except that the film thicknesses of the high refractive index films were outside of the range of 80–140 nm and the film thicknesses of the low refractive index films were outside of the range of 70–99 nm, as shown in Tables 6 and 7. The results of measurement of the optical properties are shown in Table 8. In the comparative examples, the visible light reflectivity of only the film side ("Rvis film side") was 3.0–4.2%, which was clearly inferior compared to the anti-reflection performance on visible light in the examples (0.4–0.9%). The visible light transmittance (Tvis) of the comparative examples was also less than 60%, which was inferior compared to the examples (60% or greater).

TABLE 1

| Example No. | Coating solution No. | Titanium oxide stock solution 1 (g) | Silicon oxide stock solution 2 (g) | Gold material (g) | Solvent (g) |
|---|---|---|---|---|---|
| 1 | H1 | 25.8 | 0 | 1.3 | 73.0 |
| 2 | H2 | 22.1 | 3.0 | 1.3 | 73.6 |
| 3 | H3 | 20.6 | 4.3 | 1.3 | 73.9 |
| 4 | H4 | 18.5 | 6.0 | 1.3 | 74.2 |
| 5 | H5 | 15.5 | 6.5 | 2.0 | 76.1 |
| 6 | H6 | 17.3 | 7.0 | 1.3 | 74.4 |
| 7 | H7 | 18.5 | 7.8 | 0.7 | 73.1 |
| 8 | H8 | 14.6 | 9.3 | 1.3 | 74.9 |
| 9 | H9 | 7.9 | 12.8 | 2.0 | 77.4 |
| 10 | H10 | 8.5 | 14.3 | 1.3 | 76.0 |
| 11 | H11 | 9.4 | 15.3 | 0.7 | 74.7 |
| 12 | H12 | 10.0 | 16.8 | 0 | 73.3 |
| 13 | H13 | 10.0 | 16.8 | 0 | 73.3 |
| 14 | H14 | 10.0 | 16.8 | 0 | 73.3 |
| 15 | H15 | 9.7 | 16.1 | 0.35 | 73.9 |
| 16 | H16 | 10.0 | 16.8 | 0 | 73.3 |

TABLE 2

| Example No. | Coating solution No. | Silicon oxide stock solution 2 (g) | Au material (g) | Solvent |
|---|---|---|---|---|
| 1 | L1 | 25.0 | 0 | 75.0 |
| 2 | L2 | 25.0 | 0 | 75.0 |
| 3 | L3 | 25.0 | 0 | 75.0 |
| 4 | L4 | 25.0 | 0 | 75.0 |
| 5 | L5 | 25.0 | 0 | 75.0 |
| 6 | L6 | 25.0 | 0 | 75.0 |
| 7 | L7 | 25.0 | 0 | 75.0 |
| 8 | L8 | 25.0 | 0 | 75.0 |
| 9 | L9 | 25.0 | 0 | 75.0 |
| 10 | L10 | 25.0 | 0 | 75.0 |
| 11 | L11 | 25.0 | 0 | 75.0 |

TABLE 2-continued

| Example No. | Coating solution No. | Silicon oxide stock solution 2 (g) | Au material (g) | Solvent |
|---|---|---|---|---|
| 12 | L12 | 19.3 | 2.0 | 78.8 |
| 13 | L13 | 21.3 | 1.3 | 77.5 |
| 14 | L14 | 23.0 | 0.7 | 76.3 |
| 15 | L15 | 24.0 | 0.26 | 75.7 |
| 16 | L16 | 24.0 | 0.3 | 75.7 |

TABLE 3

| Example No. | High refractive index film composition (wt %) | | | Refractive index | Film thickness (nm) |
|---|---|---|---|---|---|
| | $TiO_2$ | $SiO_2$ | Au | | |
| 1 | 85 | 0 | 15 | 2.20 | 100 |
| 2 | 73 | 12 | 15 | 2.07 | 101 |
| 3 | 68 | 17 | 15 | 2.00 | 107 |
| 4 | 61 | 23 | 15 | 1.95 | 108 |
| 5 | 51 | 26 | 23 | 1.86 | 108 |
| 6 | 57 | 28 | 15 | 1.86 | 108 |
| 7 | 61 | 31 | 8 | 1.86 | 111 |
| 8 | 48 | 37 | 15 | 1.80 | 110 |
| 9 | 26 | 51 | 23 | 1.76 | 123 |
| 10 | 28 | 57 | 15 | 1.76 | 122 |
| 11 | 31 | 61 | 8 | 1.76 | 120 |
| 12 | 33 | 67 | 0 | 1.76 | 101 |
| 13 | 33 | 67 | 0 | 1.76 | 101 |
| 14 | 33 | 67 | 0 | 1.76 | 100 |
| 15 | 32 | 64 | 4 | 1.76 | 105 |
| 16 | 33 | 67 | 0 | 1.76 | 100 |

TABLE 4

| Example No. | Low refractive index film composition (wt %) | | Refractive index | Film thickness (nm) |
|---|---|---|---|---|
| | $SiO_2$ | Au | | |
| 1 | 100 | 0 | 1.46 | 77 |
| 2 | 100 | 0 | 1.46 | 77 |
| 3 | 100 | 0 | 1.46 | 78 |
| 4 | 100 | 0 | 1.46 | 79 |
| 5 | 100 | 0 | 1.46 | 79 |
| 6 | 100 | 0 | 1.46 | 80 |
| 7 | 100 | 0 | 1.46 | 80 |
| 8 | 100 | 0 | 1.46 | 80 |
| 9 | 100 | 0 | 1.46 | 81 |
| 10 | 100 | 0 | 1.46 | 81 |
| 11 | 100 | 0 | 1.46 | 81 |
| 12 | 77 | 23 | 1.46 | 87 |
| 13 | 85 | 15 | 1.46 | 90 |
| 14 | 92 | 8 | 1.46 | 91 |
| 15 | 97 | 3 | 1.46 | 92 |
| 16 | 96 | 4 | 1.46 | 91 |

TABLE 5

| Example No. | Tvis (%) | Transmitted color tone | Transmitted light chromaticity | | Rvis (%) | |
|---|---|---|---|---|---|---|
| | | | a | b | Film side | Both sides |
| 1 | 71.0 | Green | −6.9 | −3.4 | 0.6 | 3.8 |
| 2 | 72.2 | Green | −6.7 | −3.3 | 0.7 | 3.7 |
| 3 | 73.9 | Green | −6.3 | −2.9 | 0.6 | 3.8 |
| 4 | 74.0 | Green | −6.2 | −4.1 | 0.8 | 3.6 |
| 5 | 66.2 | Green | −8.4 | −7.8 | 0.4 | 3.0 |
| 6 | 74.1 | Green | −5.6 | −5.2 | 0.7 | 3.6 |
| 7 | 82.0 | Green | −2.8 | −2.6 | 0.9 | 4.0 |
| 8 | 73.4 | Green | −3.1 | −6.5 | 0.6 | 3.7 |
| 9 | 64.8 | Blue | 0.8 | −10.5 | 0.4 | 3.4 |
| 10 | 73.2 | Blue | 0.5 | −7.0 | 0.7 | 3.7 |
| 11 | 81.6 | Blue | 0.3 | −3.5 | 0.9 | 4.1 |
| 12 | 76.8 | Reddish purple | 9.8 | −5.3 | 0.4 | 3.2 |
| 13 | 81.2 | Reddish purple | 6.5 | −3.5 | 0.7 | 3.8 |
| 14 | 85.6 | Reddish purple | 3.3 | −1.8 | 0.9 | 4.1 |
| 15 | 81.0 | Purple | 2.4 | −2.7 | 0.9 | 4.1 |
| 16 | 85.6 | Reddish purple | 2.5 | −0.8 | 0.9 | 4.3 |

TABLE 6

| Comparative Example No. | Coating solution No. | High refractive index film composition (wt %) | | | Refractive index | Film thickness (nm) |
|---|---|---|---|---|---|---|
| | | $TiO_2$ | $SiO_2$ | Au | | |
| 1 | H5 | 51 | 26 | 23 | 1.86 | 70 |
| 2 | H5 | 51 | 26 | 23 | 1.86 | 160 |
| 3 | H5 | 51 | 26 | 23 | 1.86 | 108 |
| 4 | H5 | 51 | 26 | 23 | 1.86 | 108 |

TABLE 7

| Comparative Example No. | Coating solution No. | Low refractive index film composition (wt %) | | Refractive index | Film thickness (nm) |
|---|---|---|---|---|---|
| | | $SiO_2$ | Au | | |
| 1 | L5 | 100 | 0 | 1.46 | 77 |
| 2 | L5 | 100 | 0 | 1.46 | 77 |
| 3 | L5 | 100 | 0 | 1.46 | 50 |
| 4 | L5 | 100 | 0 | 1.46 | 120 |

TABLE 8

| Comparative Example No. | Tvis (%) | Transmitted light chromaticity | | Rvis (%) | |
|---|---|---|---|---|---|
| | | a | b | Film side | Both sides |
| 1 | 58.0 | −7.9 | −7.4 | 3.0 | 6.3 |
| 2 | 55.2 | −7.7 | −7.3 | 4.0 | 7.1 |
| 3 | 56.9 | −7.3 | −7.9 | 3.2 | 6.6 |
| 4 | 54.0 | −7.2 | −7.1 | 4.2 | 7.6 |

EXAMPLE 16

Fabrication of Optical Filter

Coating solution H16 listed in Table 1 was coated by flexographic coating onto the surface of one side of a 59 cm×89 cm non-colored float glass plate with a 3.2 mm thickness and a high strain point (strain point: 575° C., refractive index=1.50), the surface of which had been polished with a cerium oxide polishing material and washed, and then a 160 W/cm high-pressure mercury lamp was used for ultraviolet irradiation for 30 seconds at an irradiation intensity of 15 mW/cm$^2$ from a distance of 10 cm, to form different first-layer high refractive index films with the compositions, refractive indexes and film thicknesses listed in Table 3. Next, coating solution L16 listed in Table 2 was applied onto the first layer film and heated at a glass temperature of 250° C. in a conveyor transport-type infrared heating furnace (furnace temperature: 300° C.) to form second-layer colored low refractive index films with the compositions, refractive indexes and film thicknesses listed in Table 4. This yielded glass plates coated with anti-reflection colored films comprising high refractive index colored films and low refractive index films formed thereon. The results of measurement of the optical properties of these anti-reflection colored film-coated glass plates are shown in Table 5.

Black ink was printed by a silk screen printing method onto the periphery (approximately 10-mm width) of the glass surface of the side (second side) opposite the side of the glass plate on which the anti-reflection colored film had been formed (first side), as a light-blocking film, and then a conductive silver paste was printed onto the black printed layer as a ground electrode and sintered at 500° C. A multilayer film of silver and inorganic oxide fine particles as described below was then formed by sputtering as an electromagnetic wave-blocking layer over the entirety of the second side. The multilayer film consisted of 13 layers laminated on the second side of the glass plate in the following order: $SnO_2$(34)-ZAO(7)-AgPd0.4(8)-ZAO(7)-$SnO_2$(50)-ZAO(7)-AgPd0.4(9)-ZAO(7)-$SnO_2$(52)-ZAO(7)-AgPd0.4(7)-ZAO(7)-$SnO_2$(35). Here, "ZAO" is a composite metal oxide film obtained by oxygen reactive sputtering from a metal target of Zn (94 wt %) and Al (6 wt %), and "AgPd0.4" is an alloy film obtained by sputtering with argon gas from a metal target of Ag (99.6 wt %) and Pd (0.4 wt %). The values in parentheses indicate the film thicknesses (nm). The multilayer film has a sheet resistance of 2.5/□ and a near-infrared transmittance of 12%. The transmitted color tone (chromaticity) when the multilayer film was formed onto the surface of one side of the non-colored float glass plate was such that a=−2.4, b=0.7, based on the Lab color specification system, and a yellowish green color was exhibited. An anti-reflection film was formed on the first side and the electromagnetic wave-blocking layer was formed on the second side of the glass plate to prevent production of interference band Newton rings upon adhesive attachment of the glass plate to a PDP with the electromagnetic wave-blocking layer facing the PDP, and a plastic film in which minute irregularities had been formed on the surface side facing the PDP was attached to the second side of the glass plate as a film to prevent glass fragments flying in the case of breakage of the glass plate, to thus obtain a PDP optical filter. The transmitted color tone of the optical filter was such that a=0.2, b=0.3, and a neutral gray color was exhibited.

EXAMPLE 17

A PDP optical filter was obtained by attaching to the second side of the glass plate a commercially available anti-reflection film (made by overlapping vapor deposited films of materials with different refractive indexes) also serving to prevent flying glass fragments, instead of attaching a plastic film with minute irregularities formed in the surface, as in Example 16.

Industrial Applicability

As explained in the above detailed description of the invention, the present invention provides anti-reflection colored film-coated glass products which have excellent anti-reflection performance for visible light, which allow freedom of control of the color tones of transmitted light, and which have high visible light transmittance. It also provides high-performance PDP optical filters that employ these anti-reflection colored film-coated glass products.

What is claimed is:

1. An anti-reflection colored film-coated glass product prepared by forming on a transparent glass substrate with a refractive index of 1.47–1.53, a high refractive index film with a refractive index of 1.59–2.30 and a film thickness of 80–140 nm and containing 0–85% silicon oxides, 10–95% titanium oxides and 5–30% fine gold particles in terms of weight percentage wherein sum of silicon oxides, titanium oxides and fine gold particles is 90 wt % or more, and by forming on said high refractive index film, a low refractive index film with a refractive index which is a value in the range of 1.35–1.58 and at least 0.20 smaller than the refractive index of said high refractive index film, having a film thickness of 70–99 nm and containing 90–100% silicon oxides in terms of weight percentage.

2. An anti-reflection colored film-coated glass product prepared by forming on a transparent glass substrate with a refractive index of 1.47–1.53, a high refractive index film with a refractive of 1.59–2.30 and a film thickness of 80–140 nm and containing 0–89% silicon oxides and 11–100% titanium oxides, in terms of weight percentage wherein sum of silicon oxides and titanium oxides is 90 wt % or more, and by forming on said high refractive index film, a low refractive index film with a refractive index which is a value in the range of 1.35–1.58 and at least 0.20 smaller than the refractive index of said high refractive index film, having a film thickness of 70–99 nm and containing 70–95% silicon oxides and 4–30% fine gold particles in terms of weight percentage.

3. An anti-reflection colored film-coated glass product prepared by forming on a transparent glass substrate with a refractive index of 1.47–1.53, a high refractive index film with a refractive index of 1.59–2.30 and a film thickness of 80–140 nm and containing 0–89% silicon oxides, 10–100% titanium oxides and 0–30% fine gold particles in terms of weight percentage, wherein sum of silicon oxides, titanium oxides and fine gold particles is 90 wt % or more and by forming on said high refractive index film, a low refractive index film with a refractive index which is a value in the range of 1.35–1.58 and at least 0.20 smaller than the refractive index of said high refractive index film, having a film thickness of 70–99 nm and containing 70–100% silicon oxides and 0–30% fine gold particles in terms of weight percentage, wherein the sum of the fine gold particle content of the high refractive index film and the fine gold particle content of the low refractive index film is 4–30 wt %.

4. An anti-reflection colored film-coated glass product according to any one of claims 1 to 3, wherein said glass product has a transmittance color represented by a chromaticity such that in terms of the Lab color specification system, a is from −15.0 to 20.0 and b is from −15.0 to 3.0.

5. An anti-reflection colored film-coated glass product according to any one of claims 1 to 3, wherein said glass product has a transmittance color represented by a chromaticity such that in terms of the Lab color specification system, a is from −5.0 to 10.0 and b is from −5.0 to 3.0.

6. An anti-reflection colored film-coated glass product according to any one of claims 1 to 3, wherein said glass product has a visible light reflectivity of 6.0% or lower including reflection from the back side when light is directed from the film side at an incident angle of 12°.

7. An anti-reflection colored film-coated glass product according to any one of claims 1 to 3, wherein said glass product has a visible light reflectivity of 1.0% or lower on the film side while blocking reflected light from the back side when light is directed from the film side at an incident angle of 12°.

8. An anti-reflection colored film-coated glass product according to any one of claims 1 to 3, wherein said transparent glass substrate is a transparent glass plate with a high strain point.

9. A plasma display panel which employs an anti-reflection colored film-coated glass product according to claim 8 as the front glass.

10. A plasma display panel optical filter characterized by being provided with an electromagnetic wave-blocking layer on the side of a glass product according to any one of claims 1 to 3 opposite the side coated with the anti-reflection colored film.

11. A plasma display panel optical filter according to claim 10, wherein said optical filter has a transmittance color represented by a chromaticity such that in terms of the Lab color specification system, a is from −3.0 to 3.0 and b is from −3.0 to 3.0.

* * * * *